United States Patent [19]
Bignardi

[11] 3,816,004
[45] June 11, 1974

[54] DEVICE FOR MEASURING THE OPACITY OF SMOKES

[75] Inventor: Luigi Bignardi, Genova, Italy

[73] Assignee: SNAM PROGETTI, S.p.A., San Donato, Milanese, Italy

[22] Filed: May 26, 1972

[21] Appl. No.: 257,370

[30] Foreign Application Priority Data
May 26, 1971  Italy .................................. 24997/71

[52] U.S. Cl. ................................ 356/207, 250/573
[51] Int. Cl. ........................................... G01n 21/12
[58] Field of Search ............. 356/207, 201; 250/218

[56] References Cited
UNITED STATES PATENTS

| | | | |
|---|---|---|---|
| 3,496,558 | 2/1970 | Willson et al. | 250/218 X |
| 3,541,336 | 11/1970 | Einstein | 356/207 X |
| 3,600,590 | 8/1971 | Einstein | 356/207 X |

*Primary Examiner*—Ronald L. Wibert
*Assistant Examiner*—Paul K. Godwin
*Attorney, Agent, or Firm*—Ralph M. Watson, Esq.

[57] ABSTRACT

An improved device for measuring the opacity of gases has been disclosed which utilizes a photoelectric optical system and an orthogonally positioned Venturi tube to monitor the opacity of gases.

2 Claims, 1 Drawing Figure

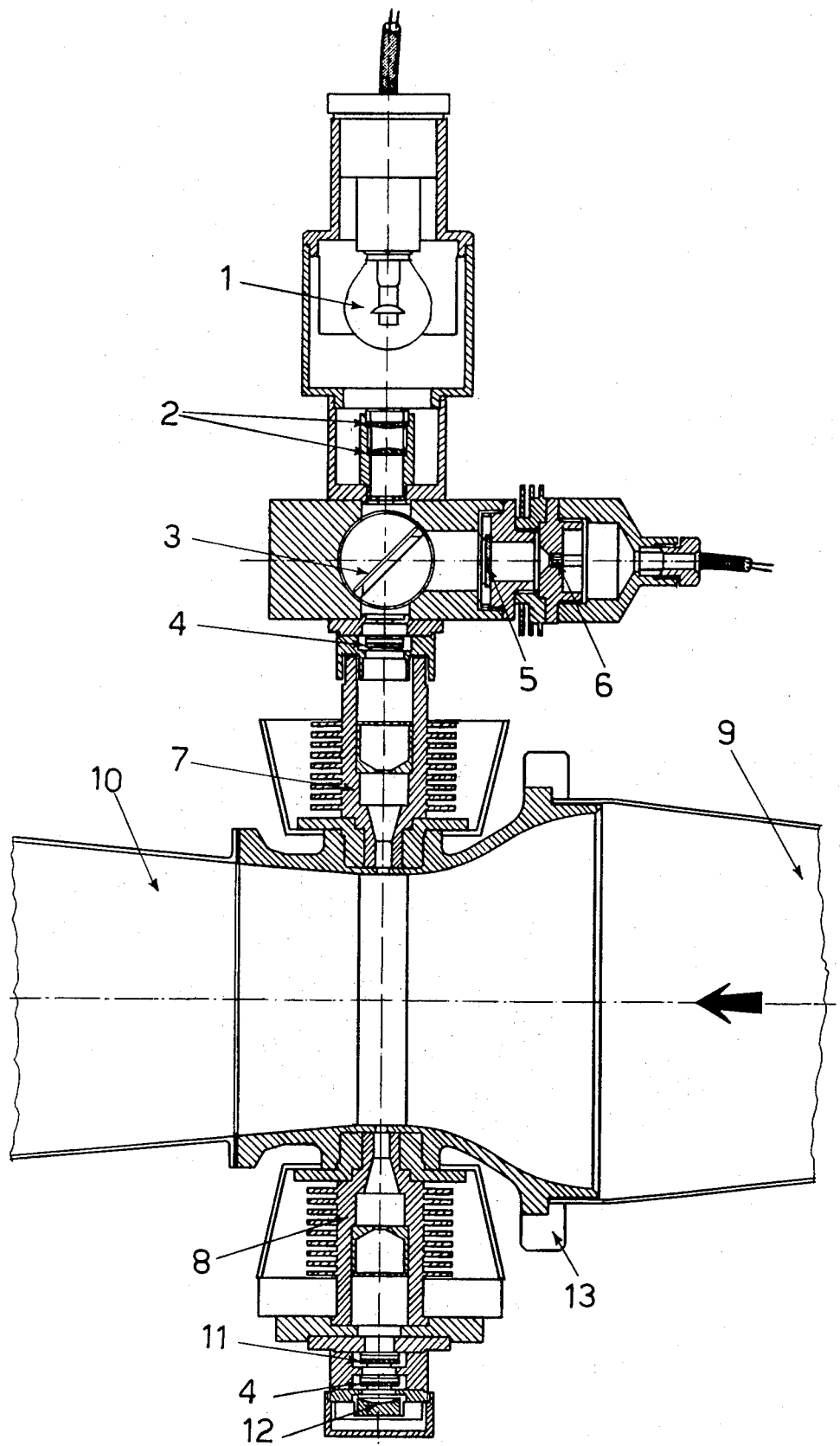

DEVICE FOR MEASURING THE OPACITY OF SMOKES

This invention relates to an apparatus for measuring the opacity of smokes. In a previous application the applicant has described a type of device comprising a particular gas inlet chamber supporting an optical system.

In such a system a light beam may be directed onto a semireflecting mirror which reflects a part thereof onto a comparison photocell and transmits the remaining part through the sample whose opacity has to be measured. The transmitted part reaches a spherical mirror and is reflected in such a way to pass again through the sample and to cover the same optical path in a reverse direction to meet the said semireflecting mirror and to be reflected partially therefrom on to a measuring photocell. The measurement is effected by comparing the values of the two photo-elements. The outlet chamber through which the fluid to be tested passes is constituted by a Venturi tube disposed perpendicularly to the optical system sample; said sample by its motion produces a reduced air pression that increases air flow and keeps the optical parts of the device clean. This device presents some drawbacks due to its particular use exhaust gases of the engines, for which subjects the apparatus is to mechanical and thermal stresses which besides damaging in a short time the apparatus can alter the values of the very measurements. Among the other drawbacks there are following drawbacks:

1. Influence on the readings that are caused by alterations of the system's geometry due to thermic deformation;
2. Increased reflections in the housing hollow of the semi-reflecting mirror.
3. Too little measuring field in particular if it is necessary to reach a value correlation with the test conditions foreseen by the rules in force or which are on the point to be approved.
4. Alteration of the measure caused by the radiation of the walls in touch with smoke.

The device of the present invention obviates these drawbacks bringing a series of improvements by means of a device substantially constituted by an outlet chamber, Venturi pipe shaped, and by an optical system. In particular the improved device for measuring the opacity of gases by the absorption of a luminous beam through which said gases are passed includes:

a. an optical system in which a source of light, a condenser system and at least one diaphragm gives rise to a luminous beam which crosses a filter system and falls first on a semi-reflecting mirror and secondly on another mirror from which said luminous beam is reflected in opposed direction, to fall on said semi-reflecting mirror and, thereafter, said luminous beam is reflected onto a photo-element;

b. an outlet chamber constituted by a Venturi tube arranged orthogonally to said optical system through which pass the gases, so that the air pressure drops with respect to the outside ambient air pressure, drawing in air in such a manner that the optical system glasses are kept clean, said device being further characterized by the following improvements:
   a. Increase of the optical path, bringing to 100 mm the diameter of the narrow section of the Venturi. Thus it has been solved the problem of point 3), obtaining in the same time, other two noticeable improvements:
      a decrease of the overpressures which are formed by rapid transistions, hence reaching higher reliabilities as regards the cleaning of the protecting glasses of the optical system;
      a decrease of the influence of the irradiation (point 4) either, obviously, from the percentage standpoint, or from the absolute standpoint, this last feature is to be ascribed to smaller equilibrium temperature of the parts.

In fact, since the thermal flux is dissipated to the outside, the walls receive from the gases a lower quantity of heat due to the reduction of the convection coefficient of the smoke (in consequence of the reduction of the flow velocity).

b. Suspension of the apparatus in a rigid armature by means of two supports having as axis that of the light beam, leaving free, by means of elastic elements, the possibility of dilatation of the system in the direction of the same axis. Thus the drawback of point 1) is eliminated.
   c. Insertion of the protective glass of the semireflecting mirror not perpendicularly to the light beam, but at an optimum angle of about 45°: thus the reflections of point 2) are eliminated.
   d. a filter placed before the photo-element measuring means to absorb the infrared radiation: thus is possible to eliminate completely the problem of point 4).
   e. Suppression of the standard photo-element. In this case there is infact, a single photo-element (that for measuring), constituted by a phototransistor, having the advantage of a remarkable simplification of the electric circuit measurement and the elimination of a possible cause of error.

It is sufficient, infact, to foresee a good stabilization system of the feeding voltage of the lamp in order to keep the zero defined before the beginning of the tests, in absence of smoke.

To the above said solutions, other ones have to be added which, even if less substantial, give to the apparatus appreciable features of practicality in the operations of cleaning and maintenance.

The protective glasses are infact quite accessible and such they can be removed, while all other elements are joined with connections which assure always the perfect alignment of the whole optical-system: e.g., the lamp can be equipped of a particular cap which will always assure the centering of the incandescent filament.

The improved device of the present invention will be better illustrated by the enclosed drawing, which does not limit the invention, in which: A lamp 1 which is positioned so that light passes through a condenser 2 to a semi-reflecting mirror 3. Protective glasses 4 and 5 are provided to protect the semi-reflecting mirror 3 and the photosensitive element 6. Spacers 7 and 8 are provided on the support member of the device. Connection cone 9 is affixed to exhaust cone 10 with ring nut 13. A test filter seat 11 and spheric reflecting mirror 12 are also provided;

I claim:

1. In a device for measuring the opacity of gases by absorption of a luminous beam through which said gases are passed, said device including:
   a. an optical system having a light source, a condenser system and a diaphragm arranged to pass a luminous beam first to a semi-reflecting mirror and then along a first path to a reflecting mirror from which said luminous beam is reflected back along said first path to said semi-reflecting mirror and is reflected along a second path onto a photoelement; and
   b. an outlet chamber having a Venturi tube positioned orthogonally to said first path for passing gases through said luminous beam of said optical system, said Venturi tube having its narrowest section coincident with said first path, the improvement which includes a Venturi which in its narrow section is not less than 100 mm in diameter, said semi-reflecting mirror being inclined relative to said luminous beam and at an angle of about 45°, an infra-red filter located in front of said photoelement along said second path and support means for suspending said device for measuring the opacity of gases on said first path of said luminous beam.

2. Improved device as in claim 1 wherein the photoelement is constituted by a photo-transistor.

* * * * *